(12) United States Patent
Wang et al.

(10) Patent No.: US 11,263,357 B2
(45) Date of Patent: Mar. 1, 2022

(54) SYSTEMS AND METHODS FOR DESIGNING MEMS SCANNING MIRRORS INVOLVING FINITE ELEMENT ANALYSIS MODEL

(71) Applicant: BEIJING VOYAGER TECHNOLOGY CO., LTD., Beijing (CN)

(72) Inventors: Youmin Wang, Mountain View, CA (US); Qin Zhou, Mountain View, CA (US); Gary Li, Mountain View, CA (US)

(73) Assignee: BEIJING VOYOAGER TECHNOLOGY CO., LTD., Beijing (CN)

( * ) Notice: Subject to any disclaimer, the term of this patent is extended or adjusted under 35 U.S.C. 154(b) by 101 days.

(21) Appl. No.: 16/907,655

(22) Filed: Jun. 22, 2020

(65) Prior Publication Data

US 2021/0397756 A1 Dec. 23, 2021

(51) Int. Cl.
*G02B 5/08* (2006.01)
*G02B 26/08* (2006.01)
(Continued)

(52) U.S. Cl.
CPC ............ *G06F 30/10* (2020.01); *G01S 7/4817* (2013.01); *G02B 27/0012* (2013.01);
(Continued)

(58) Field of Classification Search
CPC ............... G01S 3/789; G02B 5/08–10; G02B 26/0833–0866; G02B 26/10–129; G06F 30/23; G06F 30/398; G06T 17/20
See application file for complete search history.

(56) References Cited

U.S. PATENT DOCUMENTS 9,576,553 B2 * 2/2017 Pauly ..................... G06T 17/20
2018/0321483 A1 11/2018 Haran
(Continued)

FOREIGN PATENT DOCUMENTS

JP 2020515863 A 5/2020
KR 10-20200060259 A 5/2020

OTHER PUBLICATIONS

International Search Report issued in corresponding International Application No. PCT/US2021/034089, dated Sep. 10, 2021, 4 pages.
(Continued)

*Primary Examiner* — Ryan S Dunning
(74) *Attorney, Agent, or Firm* — Bayes PLLC

(57) ABSTRACT

Embodiments of the disclosure provide a design method for a LiDAR scanning mirror. The design method may include receiving, by a communication interface, design parameters of the LiDAR scanning mirror. The design method may further include setting, by at least one processor, an initial value and a step size for each design parameter. The design method may also include adjusting the design parameters according to the respective step sizes. The design method may additionally include computing one or more mirror performance indexes, by the at least one processor, by applying a Finite Element Analysis (FEA) model to the adjusted design parameters. The design method may further include determining that the mirror performance indexes meet a predetermined target performance. The design method may also include providing, by the at least one processor, the adjusted design parameters and the mirror performance indexes for making the LiDAR scanning mirror.

20 Claims, 7 Drawing Sheets

(51) Int. Cl.
*G02B 26/10* (2006.01)
*G01S 3/789* (2006.01)
*G06T 17/20* (2006.01)
*G06F 30/10* (2020.01)
*G01S 7/481* (2006.01)
*G02B 27/00* (2006.01)
*G06F 30/398* (2020.01)
*G06F 30/23* (2020.01)

(52) U.S. Cl.
CPC ........ *G02B 26/0833* (2013.01); *G02B 26/105* (2013.01); *G06F 30/23* (2020.01); *G06F 30/398* (2020.01); *G06T 17/20* (2013.01)

(56) References Cited

U.S. PATENT DOCUMENTS

2019/0120939 A1    4/2019   O'Keeffe
2020/0182975 A1    6/2020   Wang et al.

OTHER PUBLICATIONS

Written Opinion of the International Searching Authority issued in corresponding International Application No. PCT/US2021/034089, dated Sep. 10, 2021, 3 pages.

\* cited by examiner

SYSTEMS AND METHODS FOR DESIGNING MEMS SCANNING MIRRORS INVOLVING FINITE ELEMENT ANALYSIS MODEL

TECHNICAL FIELD

The present disclosure relates to designing scanner mirrors used in light detection and ranging (LiDAR) systems, and more particularly to, a method for designing LiDAR scanning mirrors by using a Finite Element Analysis (FEA) model to optimize mirror performance indexes.

BACKGROUND

LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

The LiDAR system may include a transmitter configured to emit a light beam to scan an object and a receiver configured to receive the light beam reflected by the object. The transmitter and the receiver may use optical components (e.g., microelectromechanical system (MEMS) mirrors) to steer the light beam to a range of directions. A MEMS mirror can be a single micro mirror, or an array of micro mirrors integrated into a micromachined mirror assembly made from semiconductor materials using MEMS technologies.

Designing a MEMS mirror may include determining values for design parameters of the MEMS mirror and/or accessories (e.g., springs), such as but not limited to, dimensions (e.g., length, width, and thickness) of the micro mirror(s), dimensions (e.g., length and width) of link springs, dimensions (e.g., length and width) of coupling springs, etc. The design parameters may jointly impact a performance of the MEMS mirror in the LiDAR system. Because performance function with respect to the design parameters is usually unknown, how to quickly determine values for the design parameters to meet a target performance become a big challenge for designing micro mirror arrays.

Embodiments of the disclosure address the above problems by providing a method for designing LiDAR scanning mirrors by using a Finite Element Analysis (FEA) model to optimize mirror performance indexes.

SUMMARY

Embodiments of the disclosure provide a design method for a LiDAR scanning mirror. The design method may include receiving, by a communication interface, design parameters of the LiDAR scanning mirror. The design method may further include setting, by at least one processor, an initial value and a step size for each design parameter. The design method may also include adjusting the design parameters according to the respective step sizes. The design method may additionally include computing one or more mirror performance indexes, by the at least one processor, by applying a Finite Element Analysis (FEA) model to the adjusted design parameters. The design method may further include determining that the mirror performance indexes meet a predetermined target performance. The design method may also include providing, by the at least one processor, the adjusted design parameters and the mirror performance indexes for making the LiDAR scanning mirror.

Embodiments of the disclosure also provide a design system for a LiDAR scanning mirror. The system may include a communication interface configured to receive design parameters of the LiDAR scanning mirror. The system may further include at least one processor. The at least one processor may be configured to set an initial value and a step size for each design parameter. The at least one processor may be further configured to compute one or more mirror performance indexes by applying a Finite Element Analysis (FEA) model to the adjusted design parameters. The at least one processor may be also configured to provide the adjusted design parameters and the mirror performance indexes for making the LiDAR scanning mirror.

Embodiments of the disclosure further provide a non-transitory computer readable medium having instructions stored thereon that, when executed by one or more processors, causes the one or more processors to perform a design method for a LiDAR scanning mirror. The design method may include receiving, by a communication interface, design parameters of the LiDAR scanning mirror. The design method may further include setting, by at least one processor, an initial value and a step size for each design parameter. The design method may also include adjusting the design parameters according to the respective step sizes. The design method may additionally include computing one or more mirror performance indexes, by the at least one processor, by applying a Finite Element Analysis (FEA) model to the adjusted design parameters. The design method may further include determining that the mirror performance indexes meet a predetermined target performance. The design method may also include providing, by the at least one processor, the adjusted design parameters and the mirror performance indexes for making the LiDAR scanning mirror. It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods for designing a scanning mirror (e.g., a micro mirror or a mirror array) used in LiDAR systems. In some embodiments, designing LiDAR scanning mirror may include determining a set of design parameters of the micro mirror and the corresponding parameter values. The performance of the scanning mirror may be measured using several performance indexes. In some embodiments, a Finite Element Analysis (FEA) model may be built to model the performance of the scanning mirror using the design parameter values. The modeled mirror performance may be imported into a performance simulator for adjusting the performance indexes. Determined performance indexes and the corresponding design parameter values may be used to manufacture the scanning mirror. In some embodiments, because the scanning mirror may include an array of micro mirrors that typically have a same structure, the design parameter values of one micro mirror may be applicable to other micro mirrors in the same array.

In some embodiments, design parameters of the scanning mirror may include, but not limited to, dimensions (e.g., length, width, and thickness) of the mirror, dimensions (e.g., length and width) of link springs, dimensions (e.g., length and width) of coupling springs, dimensions (e.g., length and width) of inner springs, dimensions (e.g., length and width) of edge springs, dimensions (e.g., length and width) of torsion middle springs. In some embodiments, performance indexes of the mirror may include, but not limited to, a rotational moment of inertia of the mirror, a natural frequency of the mirror, a nonlinear spring constant coefficient, a maximum stress of the mirror, a mirror bow, etc.

Figure 1:
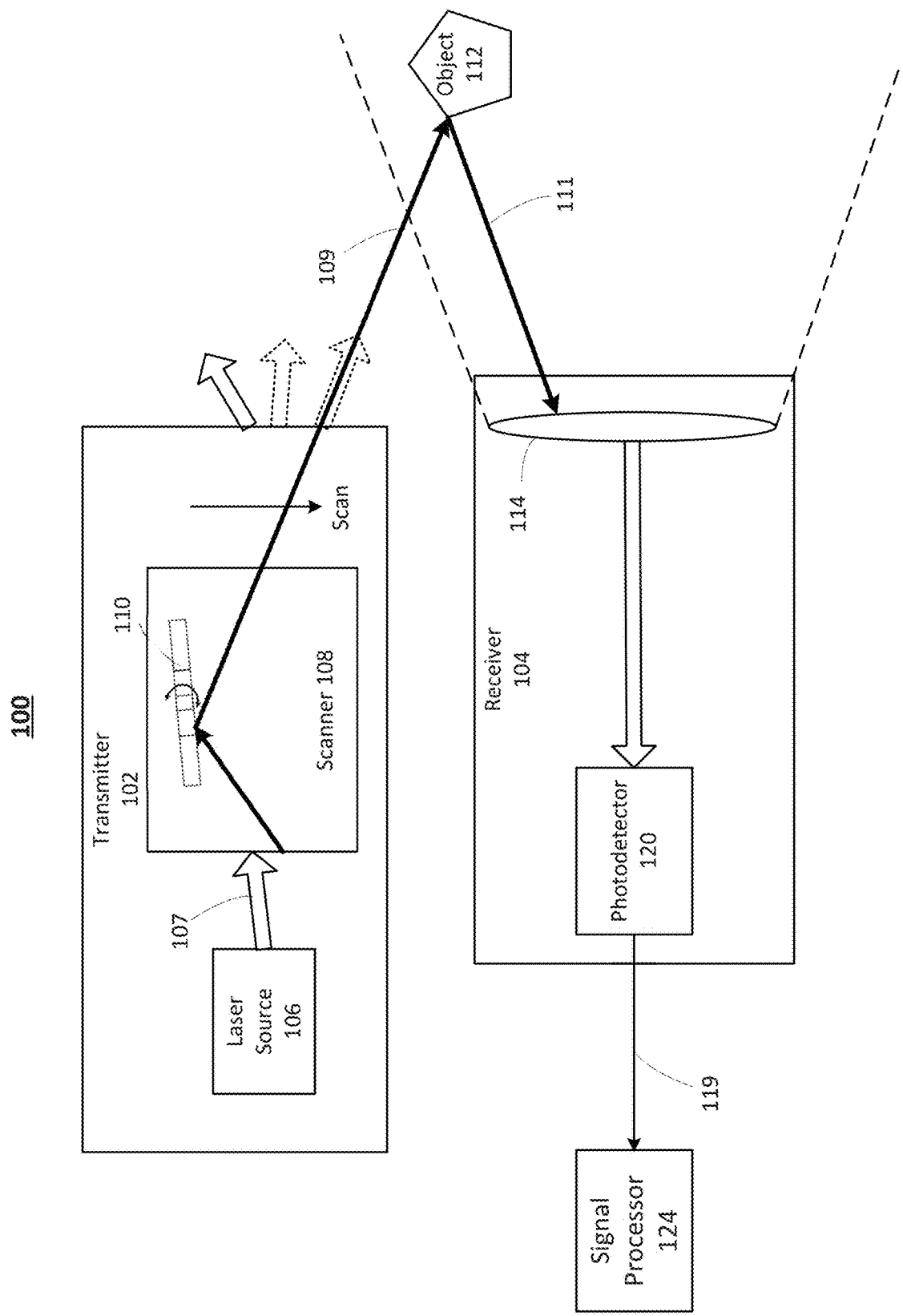
FIG. 1 illustrates a block diagram of an exemplary LiDAR system, according to embodiments of the disclosure.

FIG. 1 illustrates a block diagram of an exemplary LiDAR system 100, according to embodiments of the disclosure. LiDAR system 100 may include a transmitter 102 and a receiver 104. Transmitter 102 may emit laser beams along multiple directions. Transmitter 102 may include one or more laser sources 106 and a scanner 108.

Transmitter 102 can sequentially emit a stream of pulsed laser beams in different directions within a scan range (e.g., a range in angular degrees), as illustrated in FIG. 1. Laser source 106 may be configured to provide a laser beam 107 (also referred to as "native laser beam") to scanner 108. In some embodiments of the present disclosure, laser source 106 may generate a pulsed laser beam in the ultraviolet, visible, or near infrared wavelength range.

In some embodiments of the present disclosure, laser source 106 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 107 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser source may be used as laser source 106 for emitting laser beam 107.

Scanner 108 may be configured to emit a laser beam 109 to an object 112 in a direction within a range of scanning angles. In some embodiments consistent with the present disclosure, scanner 108 may include a micromachined mirror assembly having a rotational mirror, such as MEMS mirror 110. In some embodiments, at each time point during the scan, scanner 108 may emit laser beam 109 to object 112 in a direction within a range of scanning angles by rotating the micromachined mirror assembly. MEMS mirror 110, at its rotated angle, may deflect the laser beam 107 generated by laser sources 106 to the desired direction, which becomes laser beam 109.

In some embodiments, design parameters of MEMS mirror 110 may impact the performance of MEMS mirror 110. For example, comparing with a thin MEMS mirror, a thick MEMS mirror has a large rotational moment of inertia (as an example of performance indexes). As a result, the MEMS mirror may require a higher driving voltage to drive the mirror into oscillation. On the other hand, a thin MEMS mirror may have too much dynamic deformation or be unpractical to manufacture and have a short lifespan.

Object 112 may be made of a wide range of materials including, for example, non-metallic objects, rocks, rain, chemical compounds, aerosols, clouds and even single molecules. The wavelength of laser beam 109 may vary based on the composition of object 112. In some embodiments of the present disclosure, scanner 108 may also include optical components (e.g., lenses) that can focus pulsed laser light into a narrow laser beam to increase the scan resolution.

In some embodiments, receiver 104 may be configured to detect a returned laser beam 111 returned from object 112. The returned laser beam 111 may be in a different direction from beam 109. Receiver 104 can collect laser beams returned from object 112 and output electrical signals reflecting the intensity of the returned laser beams. Upon contact, laser light can be reflected by object 112 via backscattering, such as Rayleigh scattering, Mie scattering, Raman scattering, and fluorescence. As illustrated in FIG. 1, receiver 104 may include a lens 114 and a photodetector 120. Lens 114 may be configured to collect light from a respective direction in its field of view (FOV) and converge the laser beam to focus before it is received on photodetector 120. At each time point during the scan, returned laser beam 111 may be collected by lens 114. Returned laser beam 111 may be returned from object 112 and have the same wavelength as laser beam 109.

Photodetector 120 may be configured to detect returned laser beam 111 returned from object 112. In some embodiments, photodetector 120 may convert the laser light (e.g., returned laser beam 111) collected by lens 114 into an electrical signal 119 (e.g., a current or a voltage signal). Electrical signal 119 may be generated when photons are absorbed in a photodiode included in photodetector 120. In some embodiments of the present disclosure, photodetector 120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 100 may also include one or more signal processor 124. Signal processor 124 may receive electrical signal 119 generated by photodetector 120. Signal processor 124 may process electrical signal 119 to determine, for example, distance information carried by electrical signal 119. Signal processor 124 may construct a point cloud based on the processed information. Signal processor 124 may include a microprocessor, a microcontroller, a central processing unit (CPU), a graphical processing unit (GPU), a digital signal processor (DSP), or other suitable data processing devices.

Figure 2:
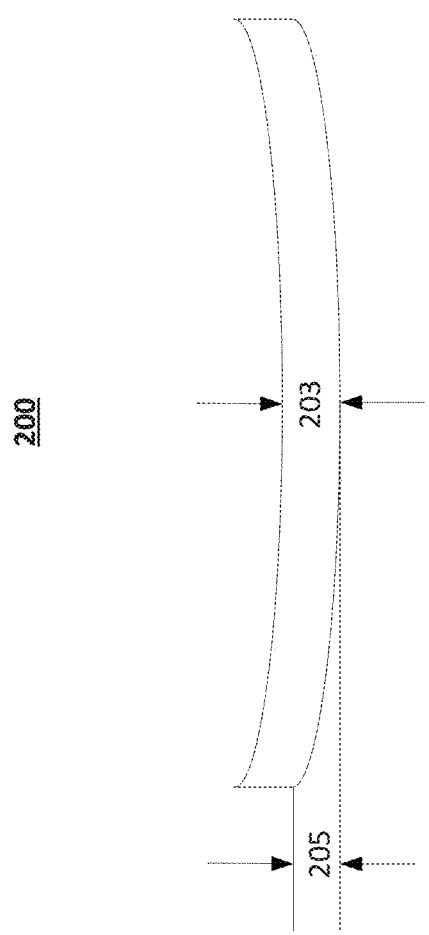
FIG. 2 illustrates a sectional view of an exemplary scanning mirror, according to embodiments of the disclosure.

FIG. 2 illustrates a sectional view of an exemplary scanning mirror 200 (e.g., MEMS mirror 110 of FIG. 1), according to embodiments of the disclosure. As shown in FIG. 2, MEMS mirror 200 may have a thickness 203 which may be a design parameter determined during the designing process of micro mirror 200. Bow 205 is distance from the highest point to the lowest point of scanning mirror 200. Consistent with some embodiments, bow 205 can be a performance index of scanning mirror 200. For example, a big bow size may induce a big optical beam divergence which may decrease the scan resolution of the LiDAR system. Therefore, a small bow size is preferred. Mathematically, the mirror bow performance index can be a function of mirror thickness. For example, it can be formulated as $P_{bow}=f(p_{thickness})$, where $p_{thickness}$ denotes mirror thickness size, and $P_{bow}$ denotes mirror bow size. Bow size may be impacted by changes of other design parameters which will be described in connection with FIGS. 3-4.

Figure 3:
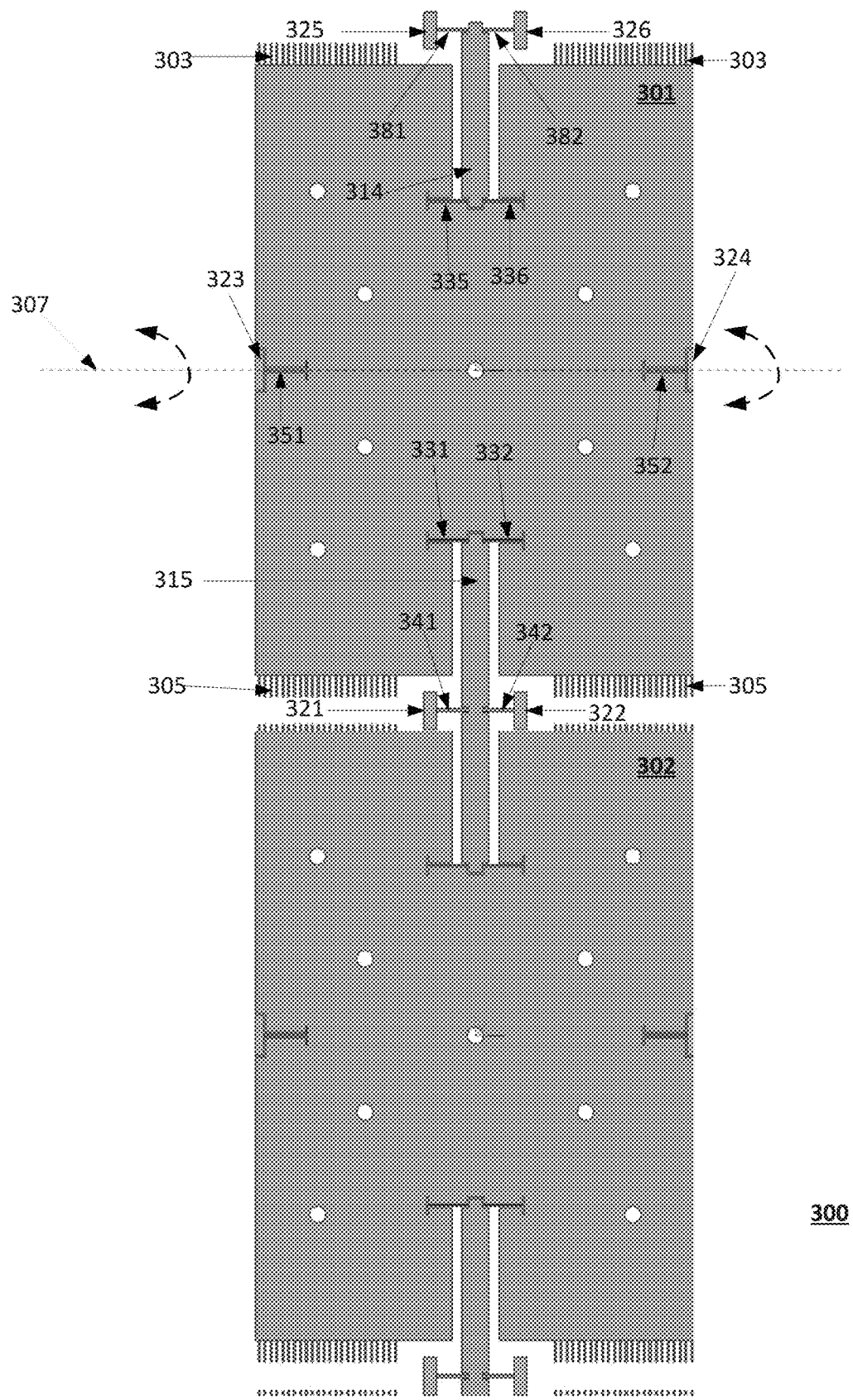
FIG. 3 illustrates a top view of an exemplary array of micro mirrors, according to embodiments of the disclosure.

FIG. 3 illustrates a top view of an exemplary array 300 of micro mirrors, (hereafter, array 300), according to embodiments of the disclosure. In some embodiments, each micro mirror in array 300 may be a MEMS mirror. As shown by FIG. 3, array 300 may include two micro mirrors (e.g., micro mirror 301 and micro mirror 302). In some embodiments, micro mirrors 301 and 302 may have an identical structure. For example, micro mirrors 301 and 302 may have same dimensions. Micro mirror 301 is coupled to a link spring 315 through a pair of coupling springs 331 and 332. Link spring 315 may be supported by anchors 321 and 322 through two inner springs (e.g., inner spring 341 and inner spring 342). As shown in FIG. 3, inner springs 341/342 and anchors 321/322 are shared by micro mirrors 301 and 302.

As shown in FIG. 3, micro mirror 301 may be configured to tilt around a tilting axis 307. Tilting axis 307 may be defined by a pair of middle torsion springs 351 and 352, as micro mirror 301 may tilt due to the rotation of middle torsion springs 351 and 352. Anchors 323 and 324 may support micro mirror 301 through middle torsion springs 351 and 352, respectively.

In some embodiments, micro mirror 301 may be actuated by a pair of actuators 303 and 305 mechanically coupled to each side of micro mirror 301, respectively. For example, actuators 303 and 305 may be comb drives. In some embodiments, a link spring 314 may be coupled to anchors 325 and 326 through a pair of edge springs 381/382 and coupled to micro mirror 301 through a pair of coupling springs 335/336. In some embodiments, coupling springs 331, 332, 335, and 336 are springs having same dimensions.

Figure 4:
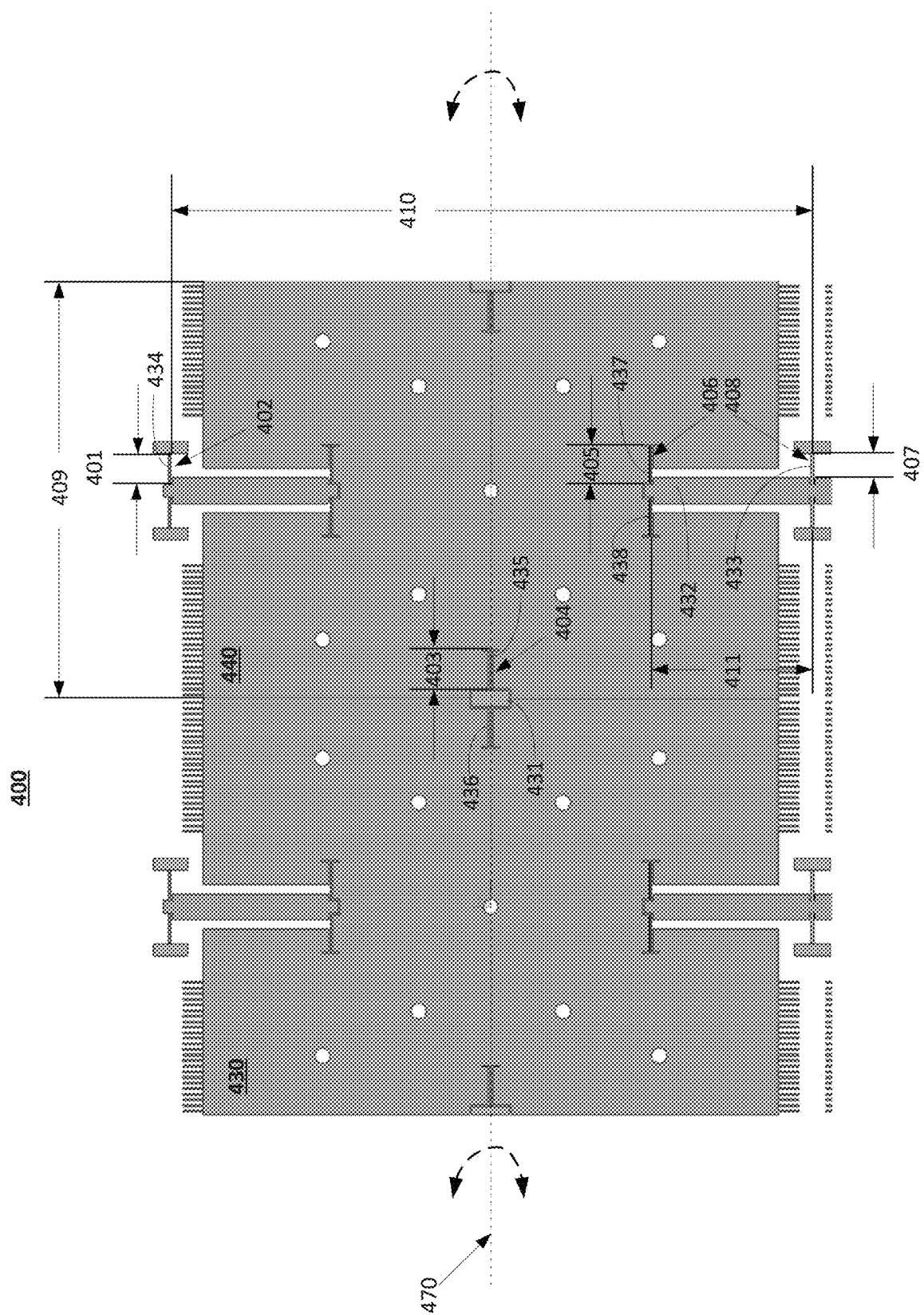
FIG. 4 illustrates a top view of another exemplary array of micro mirrors, according to embodiments of the disclosure.

FIG. 4 illustrates a top view of another exemplary array 400 of micro mirrors (hereafter, "array 400"), according to embodiments of the disclosure. Array 400 may include a micro mirror 430 and a micro mirror 440. Micro mirrors 430 and 440 may be identical in structure. For example, micro mirrors 430 and 440 may have same dimensions. In some embodiments, micro mirrors 430 and 440 may be configured to tilt around a same tilting axis (e.g., tilting axis 470). Micro mirror 430 and micro mirror 440 may be coupled to a same anchor (e.g., anchor 431) through a pair of middle torsion springs (e.g., middle torsion springs 435 and 436). As shown in FIG. 4, middle torsion spring 435 may have a length 403 and a width 404. Using a longer middle torsion spring may require a smaller electrostatic drive to rotate micro mirror 440, while using a wider middle torsion spring may require a larger electrostatic drive to rotate micro mirror 440.

As shown in FIG. 4, micro mirror 440 may have a length 410 and a width 409. It is to be understood that although micro mirrors 430 and 440 as shown in FIG. 4 are in a rectangular shape, the shape of micro mirrors 430 and 440 is not limited to a rectangular shape, and may vary in other examples, such as a square, round, or eclipse shape. For example, if micro mirror 440 is in a round shape, radius of the micro mirror may be used as a design parameter of micro mirror 440 instead of the length and width of the micro mirror.

In some embodiments, link spring 432 coupled to micro mirror 440 through coupling springs may have a length 405. Using a longer link spring may require a smaller electrostatic drive to rotate the micro mirror. In some embodiments, link spring 432 may be coupled to micro mirror 440 through coupling springs 437 and 438. Coupling springs 437 may have a length 405 and a width 406. Using a longer coupling spring may require a smaller electrostatic drive to rotate micro mirror 440, while using a wider coupling spring may require a larger electrostatic drive to rotate micro mirror 440.

In some embodiments, micro mirror 440 may share an inner spring 433 with another micro mirror (not shown). Inner spring 433 may have a length 407 and a width 408. FIG. 4 also shows an edge spring 434. Dimensions of inner spring 433 and edge spring 434 may impact the performance of micro mirror 440 in a similar way as those of coupling springs 437 and 438. For example, using a longer inner or edge spring may require a smaller electrostatic drive to rotate micro mirror 440, while using a wider inner or edge spring may require a larger electrostatic drive to rotate micro mirror 440.

Figure 5:
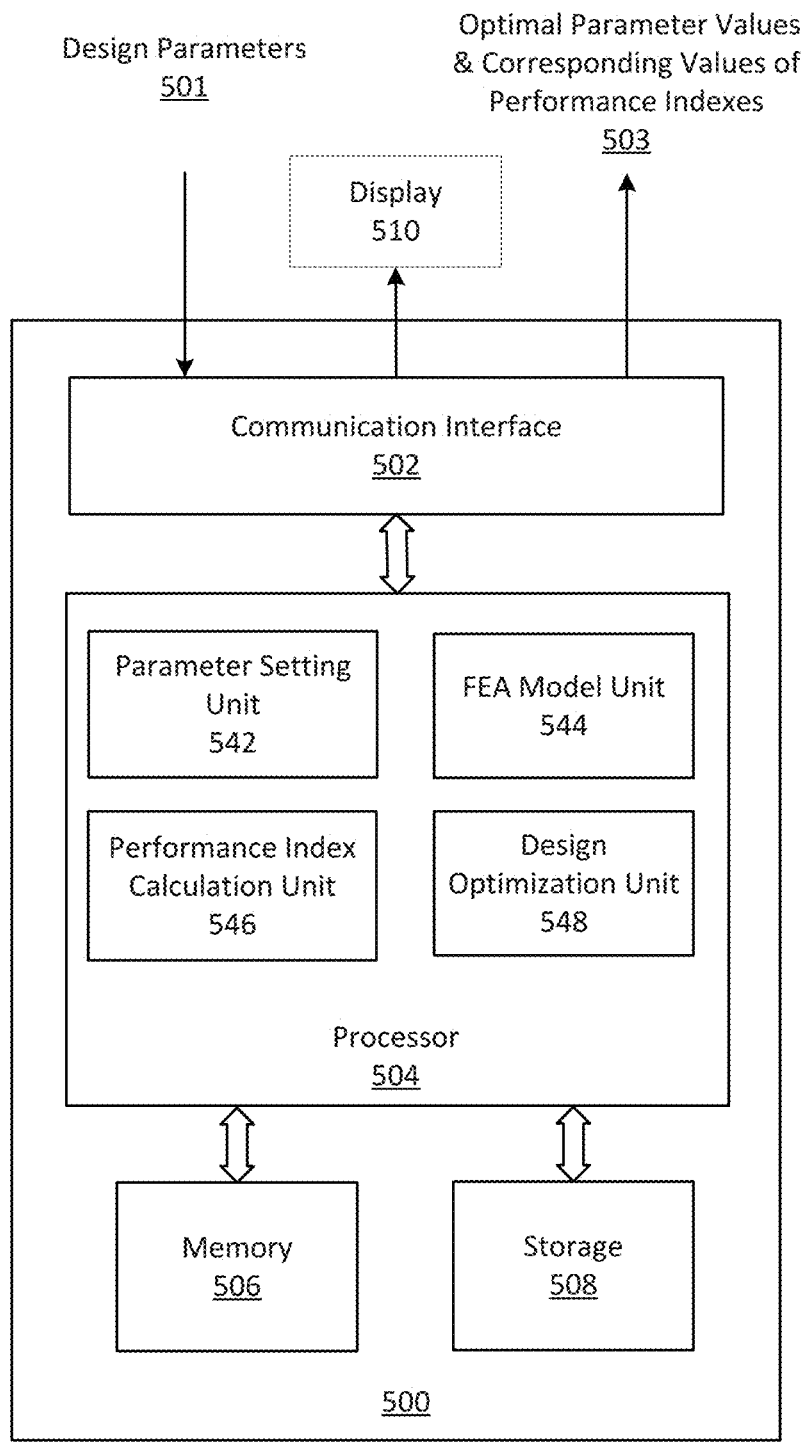
FIG. 5 illustrates a block diagram of an exemplary system for designing micro mirror arrays, according to embodiments of the disclosure.

FIG. 5 illustrates a block diagram of an exemplary system 500 for designing micro mirror arrays (e.g., MEMS mirror 110 of FIG. 1), according to embodiments of the disclosure. In some embodiments, as shown in FIG. 5, system 500 may include a communication interface 502, a processor 504, a memory 506, and a storage 508. In some embodiments, system 500 may have different modules in a single device, such as an integrated circuit (IC) chip (e.g., implemented as an application-specific integrated circuit (ASIC) or a field-programmable gate array (FPGA)), or separate devices with dedicated functions. In some embodiments, one or more components of system 500 may be located in a cloud or may be alternatively in a single location (such as inside a mobile device) or distributed locations. Components of system 500 may be in an integrated device or distributed at different locations but communicate with each other through a network (not shown). Consistent with the present disclosure, system 500 may be configured to determine the design parameter values of the scanning mirror.

Communication interface 502 may send data to and receive data from databases via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 502 may include an integrated service digital network (ISDN) card, cable modem, satellite modem, or a modem to provide a data communication connection. As another example, communication interface 502 may include a local area network (LAN) card to provide a data communication connection to a compatible LAN. Wireless links can also be implemented by communication interface 502. In such an implementation, communication interface 502 can send and receive electrical, electromagnetic or optical signals that carry digital data streams representing various types of information.

Consistent with some embodiments, communication interface 502 may receive a set of design parameters of the micro mirror arrays from a database or a user input (not shown). Communication interface 502 may further provide the received data to memory 506 and/or storage 508 for storage or to processor 504 for processing.

Processor 504 may include any appropriate type of general-purpose or special-purpose microprocessor, digital signal processor, or microcontroller. Processor 504 may be configured as a separate processor module dedicated to determining design parameter values of the scanning mirror. Alternatively, processor 504 may be configured as a shared processor module for performing other functions in addition to determining design parameter values of the scanning mirror.

Memory 506 and storage 508 may include any appropriate type of mass storage provided to store any type of information that processor 504 may need to operate. Memory 506 and storage 508 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 506 and/or storage 508 may be configured to store one or more computer programs that may be executed by processor 504 to perform functions disclosed herein. For example, memory 506 and/or storage 508 may be configured to store program(s) that may be executed by processor 504 to determine design parameter values of the scanning mirror.

In some embodiments, memory 506 and/or storage 508 may also store various Finite Element Analysis (FEA) models including their model parameters, such as an initial value and step size for each design parameter, stopping criteria such as number of iterations for each design parameter or a nominal threshold of value change between two successive iterations, etc. Memory 506 and/or storage 508 may also store intermediate data such as the mirror performance indexes of a baseline design, the mirror performance indexes based on adjusted design parameters, weights for calculating mirror performance indexes, etc.

As shown in FIG. 5, processor 504 may include multiple modules, such as a parameter setting unit 542, a FEA model unit 544, a performance index calculation unit 546, a design optimization unit 548, and the like. These modules (and any corresponding sub-modules or sub-units) can be hardware units (e.g., portions of an integrated circuit) of processor 504 designed for use with other components or software units implemented by processor 504 through executing at least part of a program. The program may be stored on a computer-readable medium, and when executed by processor 504, it may perform one or more functions. Although FIG. 5 shows units 542-548 all within one processor 504, it is contemplated that these units may be distributed among different processors located closely or remotely with each other. For example, units 542-546 may be part of an optimization device while unit 548 may be part of a separate simulation device.

Figure 6:
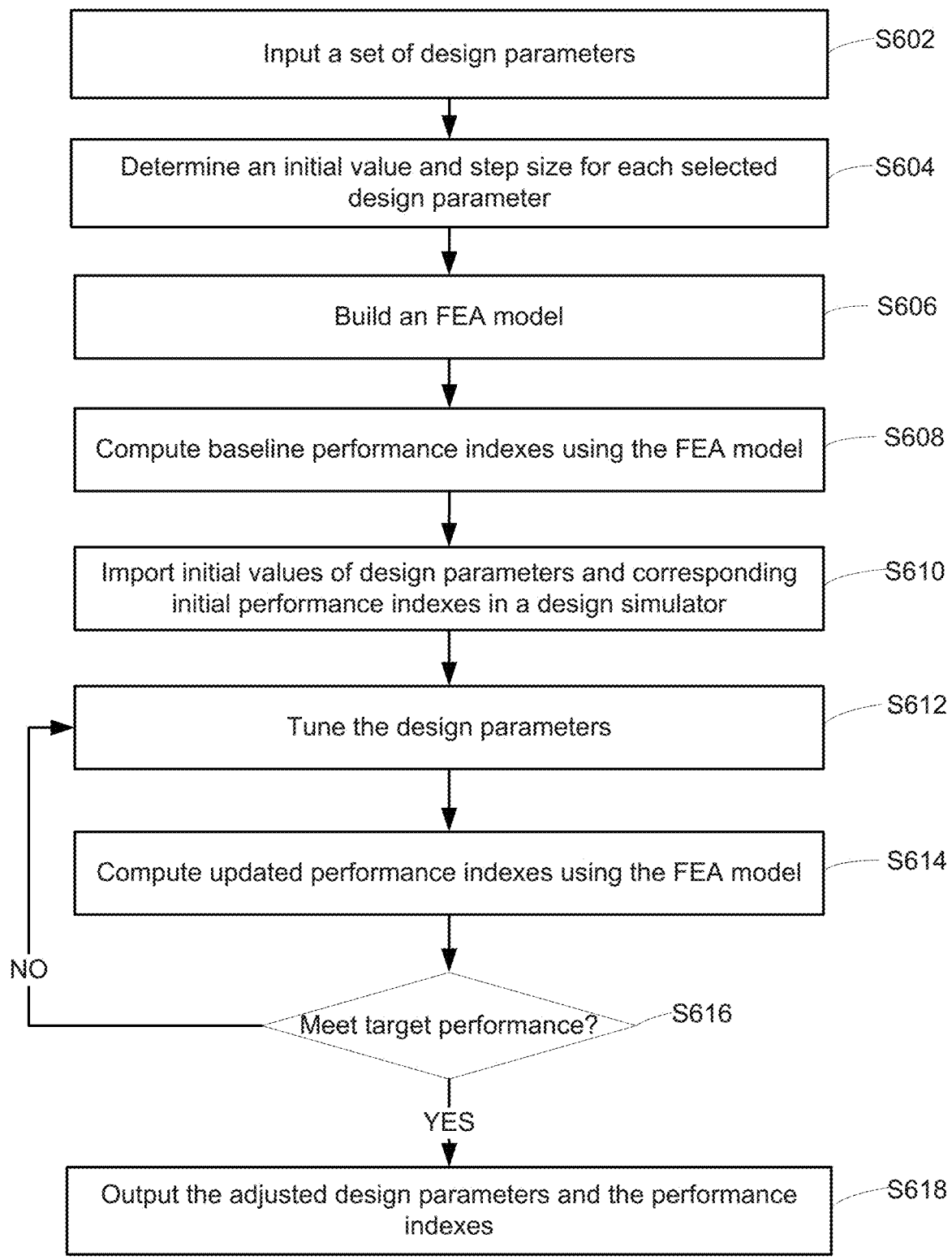
FIG. 6 illustrates a flow chart of an exemplary method for designing micro mirror arrays, according to embodiments of the disclosure.
Figure 7:
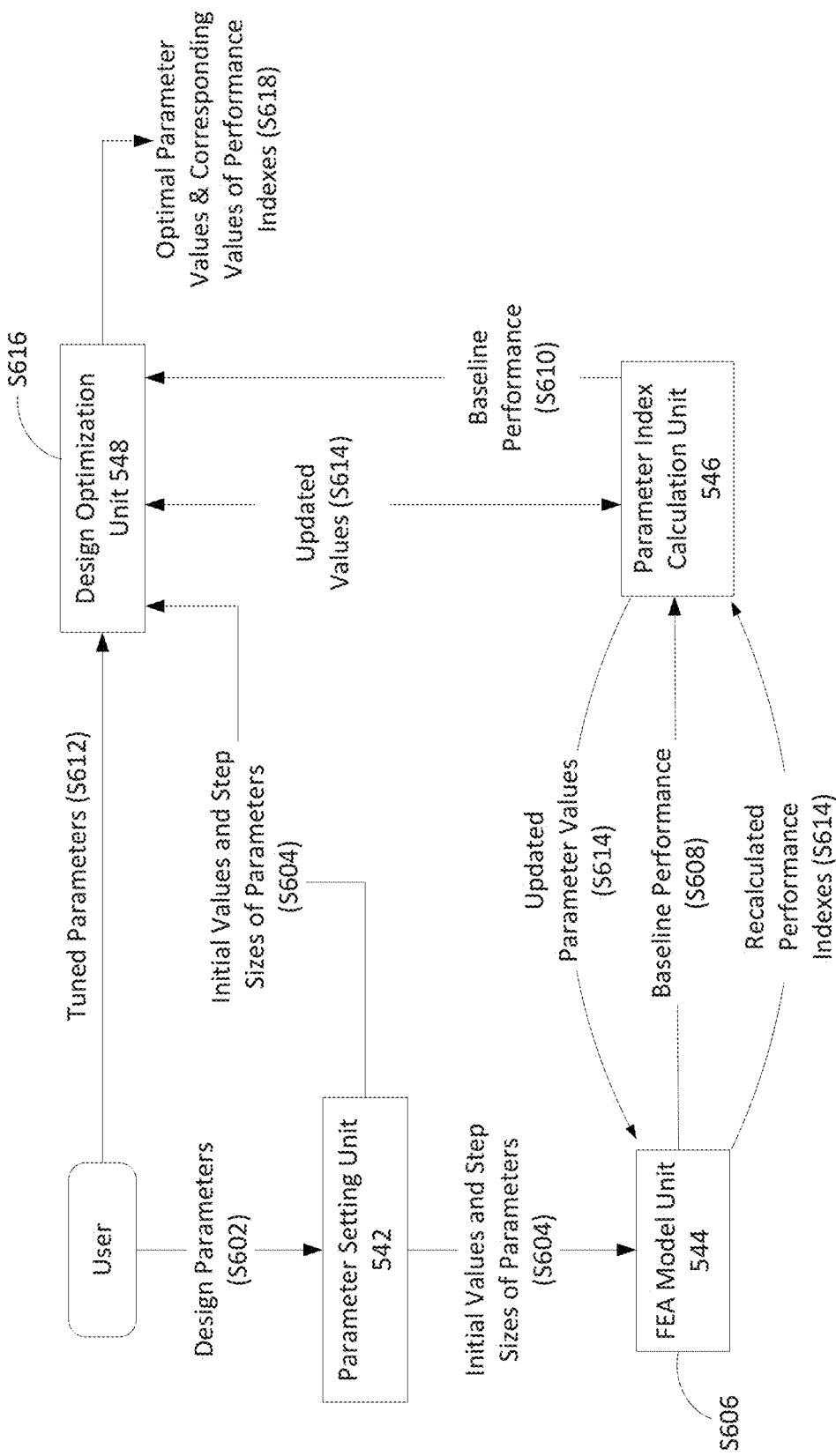
FIG. 7 illustrates a data flow diagram of an exemplary system for designing micro mirror arrays, according to embodiments of the disclosure.

In some embodiments, units 542-548 of FIG. 5 may execute computer instructions to perform determining design parameter values. FIG. 6 illustrates a flowchart of an exemplary method 600 for designing micro mirror arrays, according to embodiments of the disclosure. Method 600 may be performed by system 500 and particularly processor 504 or a separate processor not shown in FIG. 5. Method 600 may include steps S602-S618 as described below. It is to be appreciated that some of the steps may be optional, and some of the steps may be performed simultaneously, or in a different order than shown in FIG. 6. FIG. 7 illustrates a data flow diagram of an exemplary system for designing micro mirror arrays, according to embodiments of the disclosure. FIGS. 5-7 will be described together.

In step S602, communication interface 502 may receive a set of design parameters from a user input. For example, the user may specify one or more design parameters of the micro mirror that will be adjusted by method 500 to meet a target performance. For convenience of description, suppose the parameter set includes n design parameters $p_1, p_2, \ldots, p_n$, and target mirror performance P is represented by m performance indexes. For example, mirror performance index $P_j$ may be a function of n design parameters $p_1, p_2, \ldots, p_n$, which may be modeled using an FEA model that will be described in step S606. For example, the $j^{th}$ mirror performance index $P_j$ can be written as $P_j=f(p_1, p_2, \ldots, p_n)$, where $j=1, 2, \ldots, m$.

In step S604, parameter setting unit 542 may set an initial value and a step size for each design parameter. The initial values and the step sizes may be empiric values from previous mirror designs. For example, the initial values may be imported from an existing mirror design, which can be provided by a user through communication interface 502 or obtained automatically by system 500 from a database or from the cloud. The initial values may also be previously determined values using method 600 and stored in memory 506 and/or storage 508. The initial values of n parameters can be represented as $(p_{10}, p_{20}, \ldots, p_{n0})$. The step size for each parameter is a small variation according to its initial value, written as $(\Delta p_1, \Delta p_2, \ldots, \Delta p_n)$. For example, when design parameters are set to their initial values, the $j^{th}$ performance index can be represented as $P_{j0}=f(p_{10}, p_{20}, \ldots, p_{n0})$ and calculated using a FEA modeling method.

In step S606, FEA model unit 544 may build a finite element model for calculating $P(P_1, P_2, \ldots, P_m)=f(p_1, p_2, \ldots, p_n)$ based on present values of the n design parameters, where $P_1, P_2, \ldots, P_m$ are the m performance indexes and $P_1, P_2, \ldots, P_m \in P$. In some embodiments, finite element method may be used in structural design. Instead of attempting to derive and solve the equations for the model as a whole, finite element modeling method may break down the model into little pieces and solve the much simpler equations for each piece, then put the solutions for each piece back together to find a final solution.

In step S608, performance index calculation unit 546 may use the FEA model to calculate a set of baseline performance indexes based on the initial values of the design parameters as shown in FIG. 7. This may be a baseline design of the scanning mirror. For example, baseline performance $(P_{10}, P_{20}, \ldots, P_{m0})$ can be obtained by applying the initial values of design parameters $p_{10}, p_{20}, \ldots, p_{n0}$ to the FEA model to calculate $P(P_{10}, P_{20}, \ldots, P_{m0})=f(p_{10}, p_{20}, \ldots, p_{n0})$.

Steps S610-S618 may be implemented by design optimization unit 548, interaction with FEA model unit 544 and performance index calculation unit 546. In step S610, design optimization unit 548 may load the initial values of the design parameters, step sizes for the respective design parameters and the corresponding performance indexes (e.g., baseline performance index values) from parameter setting unit 542 and performance index calculation unit 546.

In step S612, the design parameters may be tuned, e.g., by applying the step size variations to the present values of the design parameters. For example, the present parameter set ($p_1, p_2, \ldots, p_n$) may be tuned to ($p_1+\Delta p_1, p_2+\Delta p_2, \ldots, p_n+\Delta p_n$). At the first iteration, the present values of the parameter set are the initial values ($p_{10}, p_{20}, \ldots, p_{n0}$) and they are tuned to ($p_{10}+\Delta p_{10}, p_{20}+\Delta p_{20}, \ldots, p_{n0}+\Delta p_{n0}$).

If ($\Delta p_1, \Delta p_2, \ldots, \Delta p_n$) are sufficiently small compared to the respective present values ($p_1, p_2, \ldots, p_n$), the $j^{th}$ performance index $P_j$ can be approximated by first order Taylor series, that is, $$P_j \approx P_{j0} + \frac{\partial P_j}{\partial p_1}\Delta p_1 + \frac{\partial P_j}{\partial p_2}\Delta p_2 + \ldots + \frac{\partial P_j}{\partial p_n}\Delta p_n,$$

where $\Delta p_1, \Delta p_2, \ldots, \Delta p_n$ are the variations, i.e., differences between adjusted values and the present values of the design parameters. In some embodiments, the differences may be magnitudes smaller compared to the corresponding present values of design parameters. In some embodiments, given the baseline performance and the partial derivatives, performance indexes ($P_1, P_2, \ldots, P_m$) can be approximately represented by Equation (1):

$$\begin{cases} P_1 \approx P_{10} + \frac{\partial P_1}{\partial p_1}\Delta_{p_1} + \frac{\partial P_1}{\partial p_2}\Delta_{p_2} + \ldots + \frac{\partial P_1}{\partial p_n}\Delta_{p_n} \\ P_2 \approx P_{20} + \frac{\partial P_2}{\partial p_1}\Delta_{p_1} + \frac{\partial P_2}{\partial p_2}\Delta_{p_2} + \ldots + \frac{\partial P_2}{\partial p_n}\Delta_{p_n} \\ \vdots \\ P_m \approx P_{m0} + \frac{\partial P_m}{\partial p_1}\Delta_{p_1} + \frac{\partial P_m}{\partial p_2}\Delta_{p_2} + \ldots + \frac{\partial P_m}{\partial p_n}\Delta_{p_n} \end{cases} \quad (1)$$

In step S614, design optimization unit 548 may call performance index calculation unit 546 to calculate a set of new mirror performance indexes based on the adjusted design parameters using equation (1). In some embodiments, performance index calculation unit 546 may perform the calculation in a loop by updating one design parameter at a time, with other design parameters fixed. For description purpose, performance index calculation for the first iteration, i.e., when the design parameters are updated from their initial values ($p_{10}, p_{20}, \ldots, p_{n0}$) to ($p_{10}+\Delta p_{10}, p_{20}+\Delta p_{20}, \ldots, p_{n0}+\Delta p_{n0}$), is described below.

Performance index calculation unit 546 may first update value of a first design parameter $p_1$ from the initial value $p_{10}$ to ($p_{10}+\Delta p_1$), where $\Delta p_1$ denotes the predetermined step size of the first design parameter $p_1$. Values of other design parameters are not updated, which may be equal to their initial values. The updated parameter values, e.g., ($p_{10}+\Delta p_1, p_{20}, \ldots, p_{n0}$), may be sent to the FEA model as shown in FIG. 7 to calculate updated performance indexes (e.g., $P_{11}, P_{21}, \ldots, P_{m1}$) based on the updated values of the design parameter $p_1$. For example, a new $j^{th}$ performance index $P_{j1}=f(p_{10}+\Delta p_1, p_{20}, \ldots, p_{n0})$ can be calculated based on the updated value of parameter $p_1$ using the FEA model.

If $\Delta p_1$ is a sufficiently small variation compared to the initial value $p_{10}$, $P_{j1}$ can be approximated by first order Taylor series, that is $$P_{j1} \approx P_{j0} + \frac{\partial P_j}{\partial p_1}\Delta p_1,$$

where $P_{j0}=f(p_{10}, p_{20}, \ldots, p_{n0})$ and $P_{j1}=f(p_{10}+\Delta p_1, p_{20}, \ldots, p_{n0})$ are calculated using the FEA model. In some embodiments, the first order partial derivative with respect to $p_1$ can be obtained based on $P_{j0}$, $P_{j1}$, and $\Delta p_1$. For example, the partial derivative can be written as $$\frac{\partial P_j}{\partial p_1} \approx \frac{P_{j1} - P_{j0}}{\Delta p_1},$$

where $P_{j0}$ and $P_{j1}$ are two $j^{th}$ performance index with different values of the first design parameter $p_1$ and $\Delta p_1$ is the step size of the first design parameter $p_1$. Using this method, partial derivatives $$\left(\frac{\partial P_1}{\partial p_1}, \frac{\partial P_2}{\partial p_1}, \ldots \ldots, \frac{\partial P_m}{\partial p_1}\right)$$

with respect to $p_1$ for all the m performance indexes can be calculated and stored in memory 506 and/or storage 508.

Performance index calculation unit 546 may further update value of a second design parameter $p_2$ from $p_{20}$ to ($p_{20}+\Delta p_2$) and keep other design parameter values unchanged. Performance index calculation unit 546 may use FEA model to calculate performance indexes (e.g., $P_{12}, P_{22}, \ldots, P_{m2}$) based on the updated value of the design parameter $p_2$, e.g., ($p_{10}, p_{20}+\Delta p_2, \ldots, p_{n0}$). For example, the $j^{th}$ performance index $P_{j2}=f(p_{10}, p_{20}+\Delta p_2, \ldots, p_{n0})$. Again, if $\Delta p_2$ is sufficiently small compared to $p_{20}$, the performance index $P_{j2}$ can be approximated by first order Taylor series. The first order partial derivatives $$\left(\frac{\partial P_1}{\partial p_2}, \frac{\partial P_2}{\partial p_2}, \ldots \ldots, \frac{\partial P_m}{\partial p_2}\right)$$

with respect to $p_2$ can be calculated for the m performance indexes using the FEA model. In some embodiments, performance index calculation unit 546 may sequentially update each design parameter value and calculate the updated performance index value with respect to the corresponding updated design parameter. In some alternative embodiments, performance index calculation unit 546 may update some or all design parameters simultaneously or in parallel.

Using the disclosed approach above, the FEA model may be executed for n times to obtain the (m×n) partial derivatives. For example, the FEA model may be further configured to calculate the (m×n) partial derivatives with respect to the n design parameter variations. For example, partial derivatives $$\left(\frac{\partial P_1}{\partial p_1}, \frac{\partial P_2}{\partial p_1}, \ldots \ldots, \frac{\partial P_m}{\partial p_1}\right)$$

can be obtained using the FEA model. The (m×n) partial derivatives obtained in n rounds of FEA model execution may include:

$$\begin{cases} \dfrac{\partial P_1}{\partial p_1} & \dfrac{\partial P_2}{\partial p_1} & \cdots & \dfrac{\partial P_m}{\partial p_1} \\ \dfrac{\partial P_1}{\partial p_2} & \dfrac{\partial P_2}{\partial p_2} & \cdots & \dfrac{\partial P_m}{\partial p_2} \\ \vdots & \vdots & \ddots & \vdots \\ \dfrac{\partial P_1}{\partial p_n} & \dfrac{\partial P_2}{\partial p_n} & \cdots & \dfrac{\partial P_m}{\partial p_n} \end{cases} \quad (2)$$

In step S616, the updated performance index values may be compared to a target performance. In some embodiments, a target performance may be the optimal performance of the scanning mirror, as specified by a user or automatically set by system 500. Consistent with the present disclosure, a target performance for the mirror bow may be a minimum bow size (e.g., flat mirror). A target performance for the rotational moment of inertia may be an empiric value. A target performance for the maximum stress of the micro mirror may be a value representing fracture strength. The performance index values are considered meeting the target performance, if the difference between the two is sufficiently small, e.g., less than a predetermined threshold.

In some embodiments, the target performance may not be met (step S616: NO). Method 600 may return to step S612 where the design parameters are further tuned. Steps S612-S616 are repeated until the target performance is met. In some embodiments, the present performance index values may be graphically displayed on a display 510 through communication interface 502. For example, values may be graphically illustrated in a vertical bar chart. For a comparison purpose, the baseline values and the target values of the performance indexes may be both graphically displayed along with the present values. The user can visually compare the baseline, the adjustment, and the target values of performance indexes. The user can dynamically adjust performance indexes by tuning the design parameters till the adjusted performance indexes outperform the target performance. In some embodiments, display 510 may also display numerical values of the performance indexes along with the graphs. In some embodiments, a weighted sum of the performance indexes may also be illustrated in display 510. The weights may be predetermined based on the significance of each performance index for the mirror. For example, the user can tune values of the parameters based on the change of the weighted sum rather than that of a plurality of performance indexes.

If the target performance is met (step S616: YES), the current design parameter values may be optimal. In step S618, optimal values of the design parameters and the corresponding values of the performance indexes based on the optimal design parameter values may be output by design optimization unit 548. In some embodiments, the optimal values of the design parameters and the corresponding values of the performance indexes can be stored in memory 506 and/or storage 508. For example, the optimal values of the design parameters can be used as initial values for designing other mirrors in the future. Consistent with some embodiments, the optimal values of the design parameters and the corresponding values of the performance indexes can be output to other storage media such as a portable device (e.g., a USB flash drive) through communication interface 502 as shown in FIG. 5. The optimal values of the design parameters may be provided to scanning mirror manufacturers to manufacture the mirrors according to such parameters. Method 600 may then conclude.

In some alternative embodiments, the partial derivatives of expression (2) can be calculated in step S608 once and reused by step S614 for all subsequent iterations. For example, FEA model may be executed n rounds besides the baseline round in step S608. In each round, one parameter may be updated to its initial value plus the corresponding step size, and other parameters are using initial values. Values of m performance indexes can be calculated in each FEA execution round. The partial derivatives of expression (2) can be calculated using equation (1). In step S614, the performance indexes can be updated based on the pre-calculated partial derivatives and the tuned parameters input by the user.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A design method for a LiDAR scanning mirror, comprising:
   receiving, by a communication interface, design parameters of the LiDAR scanning mirror;
   setting, by at least one processor, an initial value and a step size for each design parameter;
   adjusting the design parameters according to the respective step sizes;
   computing one or more mirror performance indexes, by the at least one processor, by applying a Finite Element Analysis (FEA) model to the adjusted design parameters;
   determining that the mirror performance indexes meet a predetermined target performance; and
   providing, by the at least one processor, the adjusted design parameters and the mirror performance indexes for making the LiDAR scanning mirror.

2. The method of claim 1, wherein computing the mirror performance indexes further comprises:
   computing the mirror performance indexes of a baseline design of the LiDAR scanning mirror according to the initial values of the design parameters, using the FEA model.

3. The method of claim 1, wherein computing the mirror performance indexes further comprises:
   approximating the mirror performance indexes using a Taylor series including a plurality of partial derivatives with respect to the design parameters; and
   computing the partial derivatives using the FEA model.

4. The method of claim 1, wherein computing the mirror performance indexes further comprises:
computing a weighted sum of the mirror performance indexes each weighted by a predetermined weight.

5. The method of claim 1, wherein the initial value is an empiric value provided by a user input through the communication interface.

6. The method of claim 1, wherein the LiDAR scanning mirror is a MEMS micro-mirror array comprising a plurality of mirrors, link springs configured to link mirrors and anchors, and coupling springs configured to couple mirrors and link springs.

7. The method of claim 1, wherein the mirror performance indexes comprise at least one of a rotational moment of inertia of the LiDAR scanning mirror, a natural frequency of the mirror, a mirror bow, a maximum stress of the LiDAR scanning mirror, or a mechanical nonlinearity of springs.

8. The method of claim 1, wherein the design parameters comprise at least one of a thickness of the LiDAR scanning mirror, a dimension of LiDAR scanning mirror, a dimension of the link spring, or a dimension of the coupling spring.

9. The method of claim 1, further comprising:
providing the mirror performance indexes graphically on a display.

10. A design system for a LiDAR scanning mirror, comprising:
a communication interface configured to receive design parameters of the LiDAR scanning mirror;
at least one processor, configured to:
set an initial value and a step size for each design parameter;
compute one or more mirror performance indexes by applying a Finite Element Analysis (FEA) model to the adjusted design parameters; and
provide the adjusted design parameters and the mirror performance indexes for making the LiDAR scanning mirror.

11. The system of claim 10, wherein to compute the mirror performance indexes, the at least one processor is further configured to:
compute the mirror performance indexes of a baseline design of the LiDAR scanning mirror according to the initial values of the design parameters, using the FEA model.

12. The system of claim 10, wherein to compute the mirror performance indexes, the at least one processor is further configured to:
approximate the mirror performance indexes using a Taylor series including a plurality of partial derivatives with respect to the design parameters; and
compute the partial derivatives using the FEA model.

13. The system of claim 10, wherein to compute the mirror performance indexes, the at least one processor is further configured to:
compute a weighted sum of the mirror performance indexes each weighted by a predetermined weight.

14. The system of claim 10, wherein the communication interface is further configured to receive an empiric value provided by a user input as the initial value.

15. The system of claim 10, wherein the LiDAR scanning mirror is a MEMS micro-mirror array comprising a plurality of mirrors, link springs configured to link mirrors and anchors, and coupling springs configured to couple mirrors and link springs.

16. The system of claim 10, wherein the mirror performance indexes comprise at least one of a rotational moment of inertia of the LiDAR scanning mirror, a natural frequency of the mirror, a mirror bow, a maximum stress of the LiDAR scanning mirror, or a mechanical nonlinearity of springs.

17. The system of claim 10, wherein the design parameters comprise at least one of a thickness of the LiDAR scanning mirror, a dimension of LiDAR scanning mirror, a dimension of the link spring, or a dimension of the coupling spring.

18. The system of claim 10, further comprising a display configured to provide the mirror performance indexes graphically.

19. A non-transitory computer-readable medium having stored thereon computer instructions, when executed by at least one processor, configured to perform a design method for a LiDAR scanning mirror, the method comprises:
receiving design parameters of the LiDAR scanning mirror;
setting an initial value and a step size for each design parameter;
computing one or more mirror performance indexes by applying a Finite Element Analysis (FEA) model to the adjusted design parameters; and
providing the adjusted design parameters and the mirror performance indexes for making the LiDAR scanning mirror.

20. The non-transitory computer-readable medium of claim 19, wherein computing the mirror performance indexes further comprises:
approximating the mirror performance indexes using a Taylor series including a plurality of partial derivatives with respect to the design parameters; and
computing the partial derivatives using the FEA model.

* * * * *